(12) United States Patent
Langner

(10) Patent No.: US 7,801,144 B2
(45) Date of Patent: Sep. 21, 2010

(54) SWITCH-BASED NETWORK PROCESSOR

(75) Inventor: Paul Allen Langner, Richardson, TX (US)

(73) Assignee: Agere Systems Inc., Allentown, PA (US)

(*) Notice: Subject to any disclaimer, the term of this patent is extended or adjusted under 35 U.S.C. 154(b) by 566 days.

(21) Appl. No.: 11/395,769

(22) Filed: Mar. 31, 2006

(65) Prior Publication Data

US 2007/0230475 A1 Oct. 4, 2007

(51) Int. Cl.
*H04L 12/18* (2006.01)
*H04L 12/56* (2006.01)

(52) U.S. Cl. .................................. 370/394; 370/419

(58) Field of Classification Search ............... 370/254, 370/230, 400, 401, 412, 413, 428, 429, 422; 713/150
See application file for complete search history.

(56) References Cited

U.S. PATENT DOCUMENTS

| | | | |
|---|---|---|---|
| 6,249,528 B1* | 6/2001 | Kothary | 370/466 |
| 6,404,740 B1* | 6/2002 | Yoshida | 370/241.1 |
| 6,675,223 B1* | 1/2004 | Corl et al. | 709/238 |
| 6,836,479 B1* | 12/2004 | Sakamoto et al. | 370/389 |
| 6,950,393 B1* | 9/2005 | Ben Nun et al. | 370/229 |
| 7,107,464 B2* | 9/2006 | Shapira et al. | 713/150 |
| 2003/0074473 A1* | 4/2003 | Pham et al. | 709/246 |
| 2003/0118020 A1 | 6/2003 | Calle et al. | |
| 2003/0118023 A1 | 6/2003 | Brown et al. | |
| 2003/0120790 A1 | 6/2003 | Baker et al. | |
| 2003/0202511 A1* | 10/2003 | Sreejith et al. | 370/389 |
| 2004/0151171 A1* | 8/2004 | Lee et al. | 370/380 |
| 2005/0089016 A1* | 4/2005 | Zhang et al. | 370/351 |
| 2007/0097881 A1* | 5/2007 | Jenkins et al. | 370/254 |

\* cited by examiner

*Primary Examiner*—Chirag G Shah
*Assistant Examiner*—Minh-Trang Nguyen
(74) *Attorney, Agent, or Firm*—Ryan, Mason & Lewis, LLP

(57) ABSTRACT

A network processor comprises an input interface, an output interface, a switch coupled between the input and output interfaces, and a plurality of processing elements coupled to respective bidirectional ports of the switch. Such processing elements include, in an illustrative embodiment, a scheduler, a security engine, a classification engine, a stream editor, etc. Information associated with a given packet received via the input interface is sequentially processed through multiple ones of the processing elements in a serial processing order based on switching operations of the switch. In the illustrative embodiment, the switch can permit any desired interconnection of the various processing elements so as to achieve a particular packet processing flow appropriate for a given application.

16 Claims, 3 Drawing Sheets

SWITCH-BASED NETWORK PROCESSOR

FIELD OF THE INVENTION

The present invention relates generally to packet processing systems, and more particularly to a network processor configured for use in such a system.

BACKGROUND OF THE INVENTION

Conventional network processors are often designed specifically for certain types of networking applications. For example, a given set of network processor hardware may be optimized for packet header processing and modification. Such an arrangement can advantageously provide a simple programming environment, resulting in less code being required to perform a given operation. However, it can also be unduly restrictive in terms of the range of packet processing operations that can be supported. For example, it may be difficult for a network processor with hardware optimized in the above-described manner to also accommodate enterprise network applications in which the network processor acts as a front end for one or more microprocessors performing protocol termination, transaction processing and firewall functions. Certain of the preliminary functions to be performed by the network processor in supporting enterprise network applications of this type may result in inefficient packet flows, and associated performance degradations, when conventional architectures are used.

A number of recent advances in network processors have provided improved flexibility and enhanced performance relative to prior conventional approaches. Examples of such techniques are described in U.S. Patent Application Publication Nos. 2003/0118020, entitled "Method and Apparatus for Classification of Packet Data Prior to Storage in Processor Buffer Memory," 2003/0118023, entitled "Processor with Packet Processing Order Maintenance Based on Packet Flow Identifiers," and 2003/0120790, entitled "Processor with Multiple-Pass Non-Sequential Packet Classification Feature," all of which are commonly assigned herewith and incorporated by reference herein.

Notwithstanding the considerable advances provided by the techniques outlined in the above-cited U.S. patent applications, a need remains for further improvements in network processor architectures, particularly with regard to providing support for enterprise network applications as a front end for one or more microprocessors.

SUMMARY OF THE INVENTION

The invention in an illustrative embodiment provides a network processor which includes multiple packet processing resources coupled to a switch.

In accordance with one aspect of the invention, a network processor includes an input interface, an output interface, a switch and a plurality of processing elements. The switch is coupled between the input and output interfaces of the network processor, and includes a plurality of bidirectional ports, with the processing elements being coupled to respective ones of the bidirectional ports. Information associated with a given packet received via the input interface is sequentially processed through multiple ones of the processing elements in a serial processing order based on switching operations of the switch. The information associated with the given packet may be the packet itself, or a portion of the packet.

In the illustrative embodiment, the switch provides selectable interconnection between inputs and outputs of the various processing elements. This permits any desired interconnection of the various processing elements so as to achieve a particular packet processing flow appropriate for a given application.

The network processor may be configured, for example, to provide at least first and second selectable serial processing orders for packets received via the input interface, the serial processing orders involving different interconnections of respective sets of the processing elements. Of course, any desired number of different processing orders, involving different sets of the processing elements and possibly multiple passes through one or more of the processing elements, may be provided through the switching operations of the switch.

Advantageously, the above-noted illustrative embodiment of the invention allows a network processor to support enterprise network applications while serving as a front end for one or more microprocessors, without adversely impacting packet processing performance. For example, in the illustrative embodiment, the network processor may comprise hardware optimized for a given application, such as packet header processing and modification, but can be readily configured to perform functions associated with enterprise network applications, such as protocol offload, security or pattern matching functions. Moreover, such improvements are provided while maintaining a simple programming environment and its associated code reduction.

DETAILED DESCRIPTION OF THE INVENTION

The invention will be illustrated herein in conjunction with an exemplary packet processing system which includes a network processor configured in a particular manner. It should be understood, however, that the invention is more generally applicable to any network processor in which it is desirable to provide an efficient and flexible mechanism for supporting diverse sequences of packet processing operations. A given network processor may be implemented in the form of an integrated circuit, and may itself comprise a core processing element such as a central processing unit (CPU) or other type of microprocessor, as well as memory and other circuitry.

Figure 1:
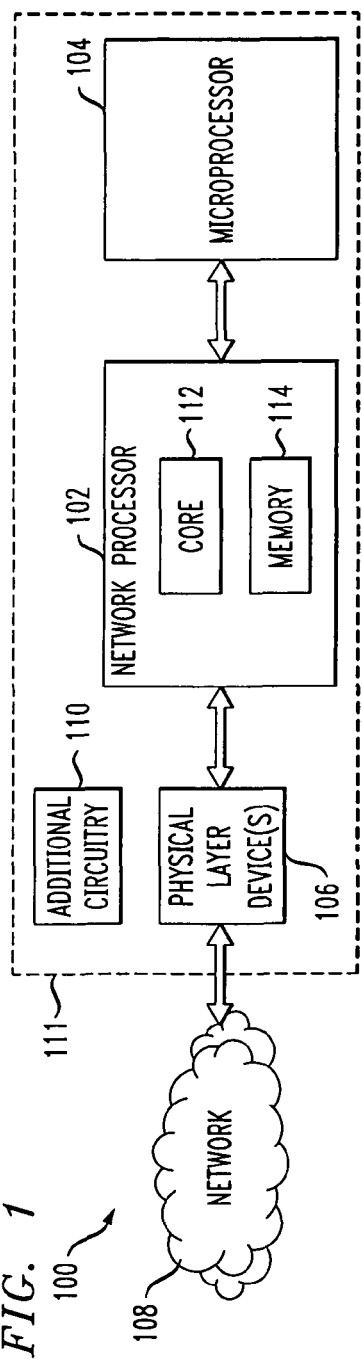
FIG. 1 is a simplified block diagram of a packet processing system comprising a network processor configured in accordance with an illustrative embodiment of the invention.

FIG. 1 shows a packet processing system 100 in which the invention is implemented. The system 100 includes a network processor 102 that is coupled between a microprocessor 104 and one or more physical layer devices 106 that provide an interface to a network 108. The network processor 102 in this embodiment performs processing operations for packets received from the network 108 via the physical layer device(s) 106, and delivers processed packets back to the network 108 via the physical layer device(s) 106. The microprocessor 104 provides processing support for the network processor 102 in performing certain types of packet processing operations. Also associated with the system 100 is additional circuitry 110 which may comprise, for example, a switch fabric, memory circuitry, one or more additional microprocessors, other processing elements, etc. in any combination. The set of elements 111 enclosed within the dashed box may be, for example, part of a line card or a port card in a router or other network device.

It should be understood that the particular arrangement of system elements shown in FIG. 1 is by way of illustrative example only. For example, as previously noted, the invention can be implemented in any type of network processor, and is not limited to any particular packet processing application.

Figure 2:
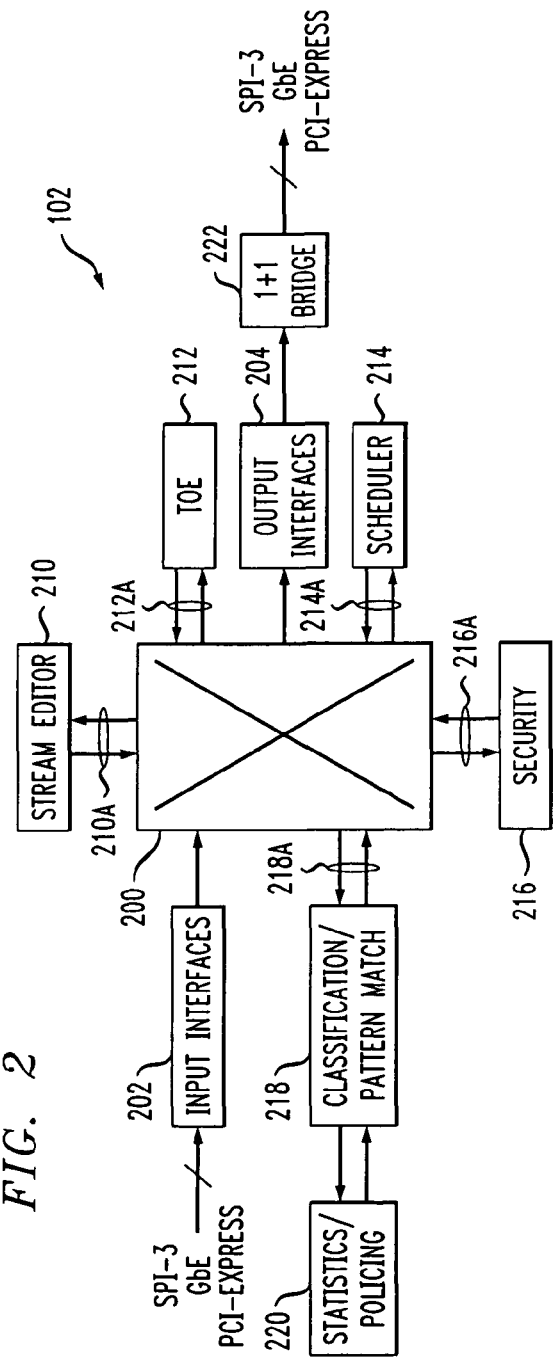
FIG. 2 is a more detailed view of the network processor of the FIG. 1 system.

FIG. 2 shows the network processor 102 of FIG. 1 in greater detail. The network processor in this embodiment comprises a switch 200, one or more input interfaces 202, and one or more output interfaces 204. The switch is coupled between the input and output interfaces of the network processor as shown. The input and output interfaces may comprise, for example, SPI-3 interfaces, Gigabit Ethernet (GbE) interfaces, PCI-Express interfaces, or other types of conventional interfaces, in any combination. Although this particular embodiment includes multiple input and output interfaces, other embodiments could include only a single input interface and a single output interface. Such interfaces generally allow the network processor to communicate with the network 108 via the physical layer device(s) 106 as previously mentioned.

The network processor 102 as shown further includes a number of packet processing resources, more generally referred to herein as "processing elements." These include, in the present embodiment, a stream editor 210, a transmission control protocol (TCP) offload engine (TOE) 212, a scheduler 214, a security engine 216 and a classification engine 218. These processing elements are coupled to respective ones of a plurality of bidirectional ports of the switch 200. The associated bidirectional connections between processing elements 210, 212, 214, 216 and 218 are designated by reference numerals 210A, 212A, 214A, 216A and 218A, respectively.

In this embodiment, the classification engine 218 comprises a joint classification and reassembly engine, and shares a bidirectional port of the switch with a pattern matching engine. Processing element 218 is therefore shown in FIG. 2 as a "classification/pattern match" element, which should be broadly construed as an element having an ability to perform classification operations only, pattern matching operations only, or both classification and pattern matching operations, depending on the needs of a particular implementation. Furthermore, the classification engine is coupled between a statistics engine 220 and the switch 200. The statistics engine 220 more particularly comprises a joint statistics and policing engine, denoted as a "statistics/policing" element, which may indicate an ability to perform statistics operations only, policing operations only, or both statistics and policing operations, again depending upon implementation-specific factors. It should be noted that, unless otherwise specified, the notation "/" as used herein should be understood to refer to "and/or."

The particular processing elements shown in FIG. 2 are merely examples, presented to illustrate the operation of one embodiment of the invention. In other embodiments, the network processor 102 may include a different set of processing elements than that shown in FIG. 2, including alternative or additional processing elements of a type commonly found in an otherwise conventional network processor. For example, separate pattern matching, statistics and/or policing engines may be coupled directly to respective additional bidirectional ports of the switch 200. The particular processing operations applied by the various processing elements may be of an entirely conventional type, well understood by those skilled in the art, and are therefore not described in further detail herein.

In accordance with an aspect of the invention, information associated with a given packet received via the input interface is sequentially processed through multiple ones of the processing elements in a serial processing order based on switching operations of the switch. Thus, with reference to the illustrative embodiment of FIG. 2, the switch 200 allows packets received via the input interface(s) 202 to be processed by multiple ones of the processing elements in a particular sequence. For example, the switch may be utilized to provide at least first and second selectable serial processing orders, or more generally an arbitrary number of different processing orders, for packets received via the input interface, with the serial processing orders involving different interconnections of respective sets of the processing elements. The network processor may thus be viewed as providing selectable interconnection between the inputs and outputs of the various processing elements. Advantageously, the switch in the illustrative embodiment can permit any desired interconnection of the various processing elements so as to achieve a particular packet processing flow appropriate for a given application. Packets will therefore flow only to the particular processing elements that are needed, and in the appropriate order. For example, in the illustrative embodiment, each processing element may be configured to pre-pend or otherwise attach a suitable next address tag to a packet before sending it back into the switch. Such a tag might also serve as a flow identifier, and may thus change from pass to pass through a particular processing element. All the connections provided by the switch can be deterministically set up and policed, allowing for express calculation of bandwidth utilization, such that the switch does not become overloaded.

The switch 200 may be implemented using, for example, an otherwise conventional shared-memory packet switch. In such an implementation, local memory requirements in the processing elements may be reduced by allowing a given packet to be written in pieces into the switch memory so as to facilitate reassembly operations, reordering operations, and other packet processing operations. In other implementations, buffering of packets may occur locally, within the processing elements, with the switch 200 comprising an otherwise conventional Ethernet switch, or other type of packet switch. Of course, various combinations of shared memory and local memory approaches may also be used. The switch need not be a packet switch, and any suitable switching mechanism for implementing a desired serial processing order through multiple ones of the processing elements may be used. Conventional aspects of packet switches and numerous other types of switches suitable for use with the present invention are well known in the art, and therefore not described in further detail herein.

The input interface(s) 202 may be configured, for example, to pre-pend or otherwise attach an initial address tag to a given packet on ingress, with the output interface(s) being configured to strip the address tags on egress. A bridging element 222 is used to handle 1+1 bridging for backplanes, as will be appreciated by those skilled in the art. Other types of known bridging techniques may be used in place of 1+1 bridging, or the bridging element may be eliminated altogether.

The FIG. 2 arrangement allows the network processor to support a wide variety of applications, including applications in which it is desirable to perform scheduling operations within packet streams, as well as multiple pass classification as in applications involving virtual private networks. Using the switch to buffer and arbitrate the ingress to processing elements such as the scheduler 214 and classification engine 218 provides a simpler, more flexible and efficient network processor design. On egress, the scheduler 214 can handle operations such as queuing using backpressure from flow control mechanisms such as in-band flow control.

A number of different serial processing orders of the network processor 102 of FIG. 2 will now be described in greater detail with reference to FIGS. 3 through 6. It is to be appreciated that these are simply examples of different sequences in which the various processing elements of the network processor 102 may be applied to information associated with a received packet. Numerous other configurations are possible, and can be easily provided through appropriate configuration of the switch 200 and the processing elements coupled thereto. A given processing flow can use any desired ordering of the processing elements, and can use any one of the processing elements as many times as is necessary for the particular application.

Figure 3:
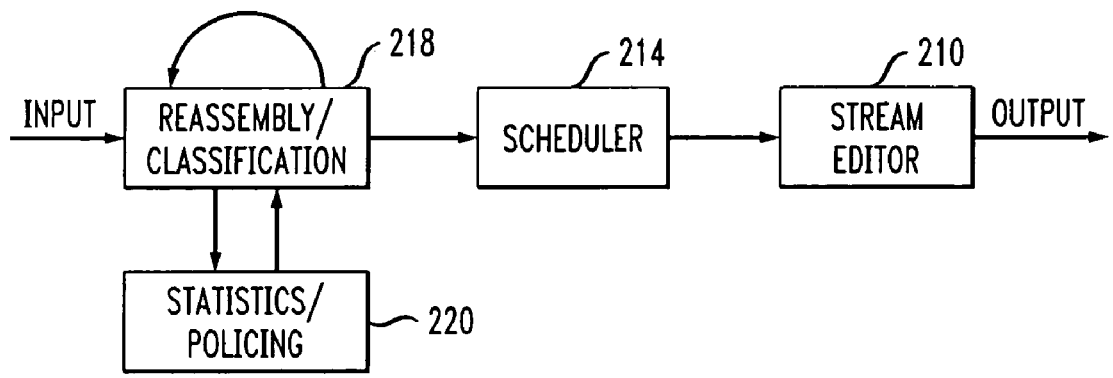
FIG. 3 is a process flow diagram illustrating a typical packet processing flow in the network processor of FIG. 2.

Referring initially to FIG. 3, a first serial processing order is shown, representative of a typical packet processing flow in the network processor of FIG. 2. In this example, a packet received at input interface 202 is processed via classification engine 218, scheduler 214 and stream editor 210 before being delivered to output interface 204. The switch 200 is utilized to ensure that the packet traverses the processing elements in this particular serial processing order. The classification engine 218 in this example more specifically operates to perform reassembly followed by classification, therefore requiring two passes as indicated by the return arrow at the top of the element in this diagram. The classification engine 218 also interacts with statistics engine 220 as shown.

In providing the first serial processing order of FIG. 3, a given packet received at input interface 202 is first directed via the switch 200 to classification engine 218. An initial address tag identifying the classification engine may be associated with the packet by the input interface before the packet is delivered to the switch, such that the switch routes the packet to the classification engine. The packet remains in the classification engine for two passes, providing reassembly followed by classification as noted above, with use of statistics engine 220 as needed. The classification engine 218 then identifies a next processing element to which the given packet received from the switch is to be routed when processing is completed in classification engine 218, and returns the given packet to the switch.

The next processing element in the serial processing order may be identified, for example, by associating a next address tag with the given packet before returning the given packet to the switch, as was indicated previously. In this example, the next address tag will identify the scheduler 214, and the switch will use the next address tag to route the packet to scheduler 214. When processing is completed in the scheduler, the scheduler will identify the next processing element in the serial processing order, by associating a different next address tag with the packet, this time identifying the stream editor 210. The switch uses the next address tag to route the packet to the stream editor 210. After processing in the stream editor is complete, that element will indicate to the switch that the packet should be routed to the output interface 204, using another next address tag or other suitable routing information. As noted above, any such tag or other routing information may be stripped from the packet by the output interface.

The typical packet processing flow of FIG. 3 may not be efficient or practical for certain types of applications, such as those involving secure transaction servers, secure sockets layer (SSL) VPN firewalls or secure Internet protocol (IPSEC) VPN firewalls. Accordingly, the switch 200 can be utilized to provide alternative serial processing orders for such applications. Examples of such alternative serial processing orders will now be described with reference to FIGS. 4, 5 and 6. It is to be appreciated, however, that these particular processing orders are not the only ones that may be supported. As indicated previously, the switch 200 may be utilized to provide any desired ordering of its associated processing elements. It is to be appreciated that a given packet may be routed from processing element to processing element by the switch in accordance with the various serial processing orders of these figures using next address tags or other suitable routing information as described above in the context of FIG. 3.

Figure 4:
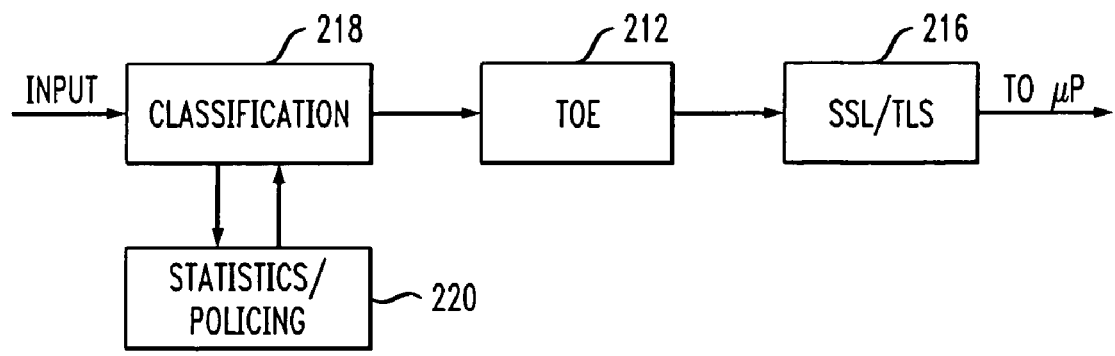
FIG. 4 is a process flow diagram illustrating the manner in which functions associated with a secure transaction server application can be implemented using the FIG. 2 network processor.

With reference now to FIG. 4, a serial processing order appropriate for a secure transaction server application is shown. In this example, a received packet is processed via classification engine 218, TCP offload engine 212 and security engine 216 before at least a portion of the packet is offloaded to the microprocessor 104 for further processing. Subsequent to the further processing, the packet may be delivered to the output interface 204. The classification engine 218 also interacts with statistics engine 220. The security engine 216 in this example performs operations associated with conventional SSL and transport layer security (TLS) protocols, which are typical in secure transactions for electronic commerce.

Figure 5:
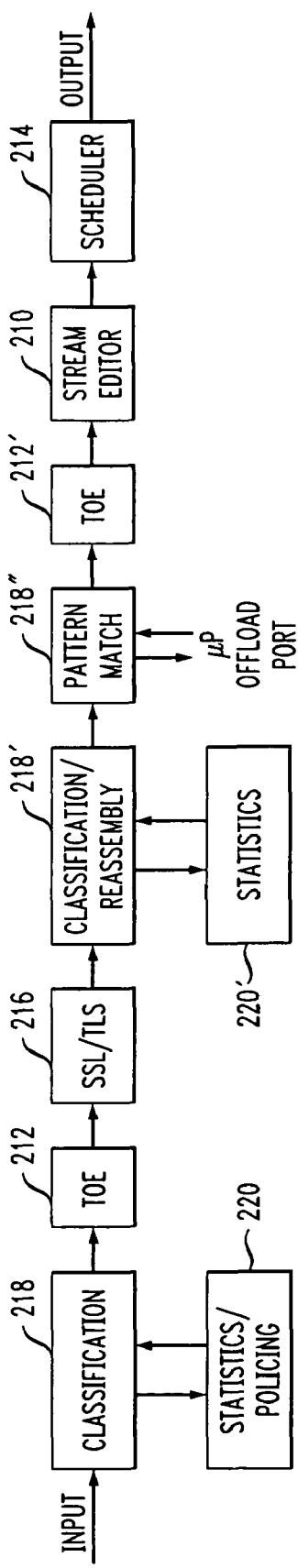
FIGS. 5 and 6 are process flow diagrams illustrating the manner in which functions associated with various firewall applications can be implemented using the FIG. 2 network processor.

Another alternative serial processing order, this one appropriate for an SSL VPN firewall application with virus scan, is shown in FIG. 5. The processing order in this example includes a first instance of classification engine 218, which interacts with a first instance of statistics engine 220, followed by TCP offload engine 212, security engine 216 implementing SSL and/or TLS protocols, and a second instance of the classification engine, which interacts with a second instance of the statistics engine. The second instances of the classification engine and statistics engine refer to second passes through the same processing elements, but are denoted 218' and 220' in the figure for clarity of illustration.

The order then continues with a third instance of the classification engine, denoted as 218" and configured to perform pattern matching operations. These operations involve offloading certain processing to the microprocessor 104, which is accomplished via an offload port associated with the processing element 218. The offload port is connectable to a corresponding input port of the microprocessor 104. In alternative embodiments, the offload port may be part of the switch 200 rather than part of the processing element.

The final steps in the processing order include a second instance of the TCP offset engine denoted as 212' followed by the stream editor 210 and finally the scheduler 214.

Figure 6:
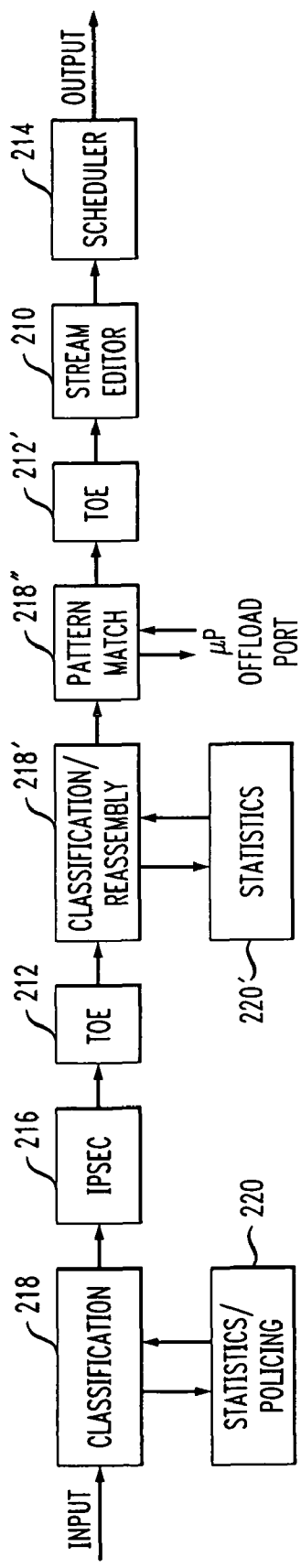

Yet another alternative serial processing order is shown in FIG. 6. This one is associated with an IPSEC VPN firewall application with virus scan. The order is similar to the one previously described in conjunction with FIG. 5, but the order of the security engine 216 and the first instance of the TCP offload engine are reversed. Also, in this example the security engine 216 performs IPSEC operations, rather than SSL and/or TLS operations.

The phrase "serial processing order" as used herein is intended to be construed broadly, so as to encompass the processing flows of FIGS. 3 through 6, as well as numerous other types of flows. It does not preclude the use of parallel processing, as a given such parallel processing arrangement may be viewed as comprising multiple serial processing orders.

As indicated previously, a given embodiment of the present invention may comprise one or more integrated circuits. In such an arrangement, a plurality of identical die is typically formed in a repeated pattern on a surface of a semiconductor wafer. Each die may include a variety of structures or circuits. The individual die are cut or diced from the wafer, then packaged as an integrated circuit. One skilled in the art would know how to dice wafers and package die to produce integrated circuits. Integrated circuits so manufactured are considered part of this invention.

The above-described embodiments of the invention are intended to be illustrative only. For example, although the illustrative embodiments utilize particular processing elements, the invention can be implemented using processing elements of any desired type. The switch and its particular manner of operation may be varied as long as different serial processing orders can be provided for received packets. Also, the term "packet" is intended to be construed broadly so as to encompass cells, protocol data units (PDUs) or other arrangements of information comprising at least a header and a payload. The phrase "information associated with a given packet" may be construed as the packet itself, or a portion of a packet. Thus, in other embodiments, various portions of a packet, rather than the entire packet, may be processed through the processing elements in a serial processing order. These and numerous other alternative embodiments within the scope of the following claims will be apparent to those skilled in the art.

What is claimed is:

1. A network processor comprising:
an input interface;
an output interface;
a switch having an input coupled to the input interface, an output coupled to the output interface, and a plurality of bidirectional ports; and
a plurality of processing elements coupled to respective ones of the bidirectional ports and configured to perform different functions, the processing elements and the bidirectional ports being separate from the input interface and the output interface;
wherein information associated with a given packet received via the input interface is sequentially processed through multiple ones of the processing elements in a serial processing order based on switching operations of the switch, wherein each of the multiple ones of the processing elements receives the information associated with the given packet via the switch;
wherein the switch is configurable to provide controllable selection between at least first and second serial processing orders each involving different interconnections of respective sets of the processing elements, said first and second serial processing orders comprising different sequences of functions, said sets including at least first and second sets with at least one of the processing elements being common to both the first and second sets;
wherein the switch is utilized to provide different serial processing orders through respective sets of the processing elements for different packets received via the input interface;
wherein a given one of the different serial processing orders is provided by configuring each non-final processing element in the corresponding set of processing elements to identify a next processing element to which a given packet received via the switch is to be routed when processing is completed in that processing element and the given packet is returned by that processing element to the switch; and
wherein one of the processing elements identifies the next processing element by associating a next address tag with the given packet before returning the given packet to the switch.

2. The processor of claim 1 wherein the switch comprises a shared-memory packet switch having a memory shared by two or more of the processing elements.

3. The processor of claim 1 wherein a given one of the different serial processing orders includes multiple passes through at least one of the processing elements in the corresponding set of processing elements.

4. The processor of claim 1 wherein the plurality of processing elements comprises one or more of a stream editor, a transmission control protocol (TCP) offload engine, a scheduler, a security engine and a classification engine.

5. The processor of claim 4 wherein the classification engine shares a bidirectional port of the switch with a pattern matching engine.

6. The processor of claim 4 wherein the classification engine is coupled between a statistics engine and the switch.

7. The processor of claim 1 wherein at least one of the processing elements comprises a microprocessor offload port that is connectable to a corresponding input port of an external microprocessor.

8. The processor of claim 1 wherein the processing elements perform functions associated with a secure transaction server application.

9. The processor of claim 1 wherein the processing elements perforin functions associated with a firewall application.

10. The processor of claim 9 wherein the processing elements perform functions associated with an SSL VPN firewall application.

11. The processor of claim 10 wherein the processing elements perform functions associated with an IPSEC VPN firewall application.

12. The processor of claim 1 wherein the processor is configured as an integrated circuit.

13. A network processor comprising:
an input interface;
an output interface;
a switch having an input coupled to the input interface, an output coupled to the output interface, and a plurality of bidirectional ports; and
a plurality of processing elements coupled to respective ones of the bidirectional ports;
wherein information associated with a given packet received via the input interface is sequentially processed through multiple ones of the processing elements in a serial processing order based on switching operations of the switch;
wherein the plurality of processing elements comprises one or more of a stream editor, a transmission control protocol (TCP) offload engine, a scheduler, a security engine and a classification engine; and
wherein the classification engine comprises a joint classification and reassembly engine.

14. A network processor comprising:
an input interface;
an output interface;
a switch having an input coupled to the input interface, an output coupled to the output interface, and a plurality of bidirectional ports; and
a plurality of processing elements coupled to respective ones of the bidirectional ports;
wherein information associated with a given packet received via the input interface is sequentially processed through multiple ones of the processing elements in a serial processing order based on switching operations of the switch;

wherein the plurality of processing elements comprises one or more of a stream editor, a transmission control protocol (TCP) offload engine, a scheduler, a security engine and a classification engine;

wherein the classification engine is coupled between a statistics engine and the switch; and wherein the statistics engine comprises a joint statistics and policing engine.

15. A processing system comprising:
a network processor; and
a microprocessor coupled to the network processor;
the network processor comprising:
an input interface;
an output interface;
a switch coupled between the input and output interfaces; and
a plurality of processing elements coupled to respective bidirectional ports of the switch and configured to perform different functions, the processing elements and the bidirectional ports being separate from the input interface and the output interface;
wherein information associated with a given packet received via the input interface is sequentially processed through multiple ones of the processing elements in a serial processing order based on switching operations of the switch, wherein each of the multiple ones of the processing elements receives the information associated with the given packet via the switch; and
wherein the switch is configurable to provide controllable selection between at least first and second serial processing orders each involving different interconnections of respective sets of the processing elements, said first and second serial processing orders comprising different sequences of functions, said sets including at least first and second sets with at least one of the processing elements being common to both the first and second sets;
wherein the switch is utilized to provide different serial processing orders through respective sets of the processing elements for different packets received via the input interface;
wherein a given one of the different serial processing orders is provided by configuring each non-final processing element in the corresponding set of processing elements to identify a next processing element to which a given packet received via the switch is to be routed when processing is completed in that processing element and the given packet is returned by that processing element to the switch; and
wherein one of the processing elements identifies the next processing element by associating a next address tag with the given packet before returning the given packet to the switch.

16. A method for use in processing packets in a network processor, the network processor comprising an input interface, an output interface, a switch coupled between the input and output interfaces, and a plurality of processing elements coupled to respective bidirectional ports of the switch and configured to perform different functions, the processing elements and the bidirectional ports being separate from the input interface and the output interface, the method comprising the step of:
sequentially processing information associated with a given packet received via the input interface through multiple ones of the processing elements in a serial processing order based on switching operations of the switch, wherein each of the multiple ones of the processing elements receives the information associated with the given packet via the switch; and
wherein the switch is configurable to provide controllable selection between at least first and second serial processing orders each involving different interconnections of respective sets of the processing elements, said first and second serial processing orders comprising different sequences of functions, said sets including at least first and second sets with at least one of the processing elements being common to both the first and second sets;
wherein the switch is utilized to provide different serial processing orders through respective sets of the processing elements for different packets received via the input interface;
wherein a given one of the different serial processing orders is provided by configuring each non-final processing element in the corresponding set of processing elements to identify a next processing element to which a given packet received via the switch is to be routed when processing is completed in that processing element and the given packet is returned by that processing element to the switch; and
wherein one of the processing elements identifies the next processing element by associating a next address tag with the given packet before returning the given packet to the switch.

* * * * *

UNITED STATES PATENT AND TRADEMARK OFFICE
CERTIFICATE OF CORRECTION

PATENT NO. : 7,801,144 B2
APPLICATION NO. : 11/395769
DATED : September 21, 2010
INVENTOR(S) : Paul A. Langner It is certified that error appears in the above-identified patent and that said Letters Patent is hereby corrected as shown below:

Claim 9, col. 8, line 29, please delete "perforin" and insert --perform--.

Signed and Sealed this

Sixteenth Day of November, 2010

David J. Kappos
*Director of the United States Patent and Trademark Office*